(12) United States Patent
Van Phan et al.

(10) Patent No.: US 9,031,596 B2
(45) Date of Patent: May 12, 2015

(54) CONNECTION ARRANGEMENT IN RELAYED WIRELESS COMMUNICATIONS

(75) Inventors: Vinh Van Phan, Oulu (FI); Ling Yu, Oulu (FI); Kari Veikko Horneman, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 255 days.

(21) Appl. No.: 13/643,574

(22) PCT Filed: Apr. 26, 2010

(86) PCT No.: PCT/EP2010/055552
§ 371 (c)(1),
(2), (4) Date: Dec. 10, 2012

(87) PCT Pub. No.: WO2011/134493
PCT Pub. Date: Nov. 3, 2011

(65) Prior Publication Data
US 2013/0084795 A1    Apr. 4, 2013

(51) Int. Cl.
| | | |
|---|---|---|
| *H04W 36/22* | (2009.01) | |
| *H04W 4/06* | (2009.01) | |
| *H04W 80/04* | (2009.01) | |
| *H04W 24/04* | (2009.01) | |
| *H04W 4/16* | (2009.01) | |
| *H04W 88/04* | (2009.01) | |
| *H04B 7/155* | (2006.01) | |
| *H04B 7/26* | (2006.01) | |
| *H04W 84/04* | (2009.01) | |

(52) U.S. Cl.
CPC ............ *H04W 88/04* (2013.01); *H04B 7/15592* (2013.01); *H04B 7/2606* (2013.01); *H04W 84/047* (2013.01)

(58) Field of Classification Search
CPC ...... H04H 20/24; H04H 20/26; H04W 36/14; H04W 36/22; H04W 4/06; H04W 36/0011; H04W 36/0027; H04W 80/04; H04W 24/04; H04W 4/16

See application file for complete search history.

(56) References Cited

U.S. PATENT DOCUMENTS

| | | | |
|---|---|---|---|
| 8,483,116 B2 * | 7/2013 | Chang et al. ................... | 370/315 |
| 8,605,641 B2 * | 12/2013 | Youn et al. ..................... | 370/312 |
| 8,654,699 B2 * | 2/2014 | Zhang et al. ................... | 370/315 |
| 8,743,773 B2 * | 6/2014 | Senarath et al. ............... | 370/315 |
| 8,824,383 B2 * | 9/2014 | Lindoff et al. ................. | 370/329 |

(Continued)

OTHER PUBLICATIONS

3GPP TR 36.012 V9.2.0 (Mar. 2010), "3rd Generation Partnership Project; Technical Specification Group Radio Access network; Feasibility study for Further Advancements for E-UTRA (LTE-Advanced) (Release 9)" 61 pgs.

*Primary Examiner* — Bobbak Safaipour
(74) *Attorney, Agent, or Firm* — Harrington & Smith (57) ABSTRACT

The present document describes a distributed communication arrangement, wherein a radio access network of a wireless telecommunication system provides a terminal device with two logical communication connections. Both uplink and downlink of a first logical connection are routed between a base station and the terminal device through a relay node. Uplink of a second logical connection is also routed between the base station and the terminal device through the relay node. Downlink of the second logical connection is, however, transmitted directly from the base station to the terminal device. Such an arrangement is used for cooperative communication purposes.

24 Claims, 3 Drawing Sheets

(56) References Cited

U.S. PATENT DOCUMENTS

| | | |
|---|---|---|
| 8,099,041 B1* | 1/2012 | Bugenhagen et al. ............ 455/7 |
| 2007/0159996 A1* | 7/2007 | Park et al. .................... 370/328 |
| 2008/0253334 A1* | 10/2008 | Torsner et al. ................ 370/331 |
| 2008/0285499 A1 | 11/2008 | Zhang et al. .................. 370/315 |
| 2013/0084795 A1* | 4/2013 | Van Phan et al. ................ 455/15 |
| 2013/0252541 A1* | 9/2013 | Bugenhagen et al. ............ 455/7 |

* cited by examiner

```
202: ESTABLISH WIRELESS COMMUNICATION CONNECTION WITH TERMINAL DEVICE
                              ↓
204: COMMUNICATE WITH TERMINAL DEVICE OVER
UL AND DL OF FIRST CONNECTION TRHOUGH RELAY NODE
                              ↓
206: COMMUNICATE WITH TERMINAL DEVICE OVER
UL OF SECOND CONNECTION TRHOUGH RELAY NODE
```

Fig 2

```
302: ESTABLISH WIRELESS COMMUNICATION CONNECTION WITH RADIO ACCESS NETWORK
                              ↓
304: COMMUNICATE WITH RELAY NODE OVER UL AND DL OF FIRST CONNECTION
                              ↓
306: COMMUNICATE WITH RELAY NODE OVER UL OF SECOND CONNECTION
                              ↓
308: COMMUNICATE WITH ENB OVER DL OF SECOND CONNECTION
```

CONNECTION ARRANGEMENT IN RELAYED WIRELESS COMMUNICATIONS

FIELD

The invention relates to the field of cellular radio telecommunications and, particularly, to an arrangement of connections of a terminal device having relayed connections.

BACKGROUND

In a modern communication environment, a user of a terminal device (a cellular phone, for example) may conduct multiple communication sessions simultaneously, where each session is linked to a different radio bearer service or a logical connection with a serving radio access network of a cellular telecommunication system. One connection may be a telephone call while the other is related to downloading music or video files. Relayed connections have been proposed for use to improve a coverage area and capacity for such a user with high traffic demands. In connection with relayed communications, all connections between a base station and the terminal device are typically either transferred directly between the base station and the terminal device or relayed through a relay node between the base station and the terminal device.

BRIEF DESCRIPTION

According to aspects of the present invention, there are provided methods.

According to other aspects of the present invention, there are provided apparatuses.

According to yet another aspect of the present invention, there is provided a computer program product embodied on a computer-readable distribution medium.

According to yet another aspect of the present invention, there is provided a wireless telecommunication system.

Further embodiments of the invention are defined in various dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features/structures that have not been specifically mentioned.

Figure 1A:
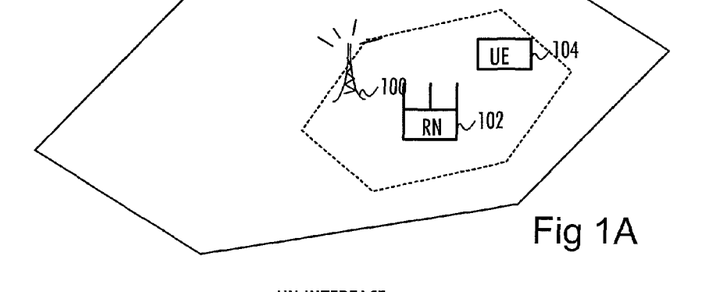
FIG. 1A illustrates a communication scenario to which embodiments of the invention may be applied.

A general communication scenario in a cellular telecommunication system providing terminal devices (UE) with voice and data transfer services is illustrated in FIG. 1. The cellular telecommunication system may be based on an evolution version of the Universal Mobile Telecommunication System (UMTS LTE or UMTS LTE-Advanced), but the present invention is not limited to only this radio communication standard. However, the exemplary embodiments are described herein in the context of the UMTS LTE(A), and such terminology may exist. For example, a base station controlling communications within its coverage area (including relayed connections) is called eNB (also known as donor eNB in the art), while a node relaying connections to/from the eNB under the control of the eNB is called a relay node. Described exemplary interfaces between two entities of the relayed connections are also based on the UMTS. For example, an interface between the eNB and a relay node is called Un interface, and an interface between the eNB and the terminal device or between the relay node and the terminal device is called Uu interface.

Referring to FIG. 1, a base station 100 provides a terminal device 104 with such wireless services within its coverage area known as a cell and illustrated in FIG. 1 with a hexagon (solid lines). In order to improve coverage and capacity within a sub-area of the cell, there is provided one or more relay nodes 102 that relay connections between the base station 100 and the terminal device 104 within its coverage area forming a sub-cell illustrated in FIG. 1 with another hexagon (dashed lines). The relay node may be a fixed relay node or a mobile relay node, it may even be another terminal device operating as the relay node for the terminal device 104. In some embodiments, particularly when the relay node 102 is a terminal device, the connection between the base station 100 and the relay node 102 is a wireless connection (wireless Un interface), and the base station 100 schedules transmissions of all connections amongst the base station 100, the relay node 102, and the terminal device 104. As the terminal device 104 moves in and out of the sub-cell, the connection(s) may be handed over between the relay node 102 and the base station 100.

Figure 1B:
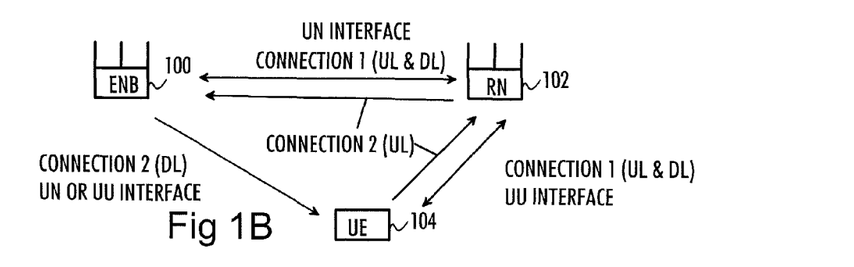
FIG. 1B illustrates a communication arrangement according to an embodiment of the invention.

FIG. 1B illustrates a connection arrangement according to an embodiment. The terminal device 104 has currently two active connections, e.g. a phone call session and a file download session, and the radio access network has allocated separate logical connections or bearer services to both connections. The connection arrangement of FIG. 1B may result from a handover of the terminal device's connections between the base station (donor eNB) 102 and the relay node, or it may result in the establishment of at least one of the two connections. Referring to FIG. 1, both uplink and downlink connections of a first logical connection are routed through the relay node 102. With respect to a second logical connection (a different logical connection handled as logically separate from the first logical connection), the downlink is delivered directly from the base station 100 to the terminal device 104, while all uplink communication of the second connection is routed through the relay node 102. This connection arrangement is advantageous in a situation where the terminal device is in a coverage area best served by the relay node, but it may still be able to receive from the base station well in the downlink. Such situations may appear, for example, in frequency division duplexing (FDD) systems where a downlink frequency band is on a lower band than an uplink frequency band, thereby providing better penetration and coverage. However, another connection may have such requirements that it is more beneficial to have both uplink and downlink routed through the same path.

The connection communicated through different routes may be any one of the two (or more) connections, and the connection to be routed in such a manner may be determined according to certain rules. Such an arrangement may be applied to a certain capability class or a priority group of terminal devices, certain types of connections, bearers or services the terminal device has (separated uplink/downlink is only applied to downlink-intensive connections), certain coding and modulation schemes (including forms of network coding), certain cell load or load balancing states, channel conditions, specified mobile battery status, etc.

Figure 2:
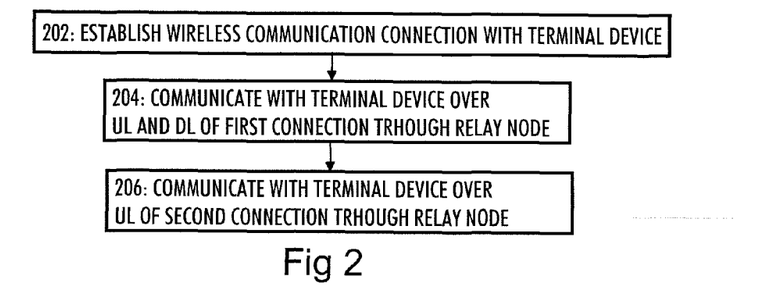
FIGS. 2 and 3 are flow diagrams describing processes for operating the communication arrangement of FIG. 1B in apparatuses according to embodiments of the invention.

FIG. 2 illustrates a process for arranging connections in a network element of the cellular telecommunication system. The process may be carried out in a communication circuitry of the base station or the relay node. Referring to FIG. 2, a wireless communication connection with a terminal device is established in block 202. Block 202 may include establishment of two logically separate connections with the terminal device, where the different logical connections relate to different communication applications operated in the terminal device.

In block 204, the network element communicates with the terminal device over a first logical connection comprising an uplink physical connection and a downlink physical connection both routed through the relay node. With respect to the operation from the viewpoint of the base station, the base station communicates in block 204 all data of the first logical connection through the relay node. From the viewpoint of the relay node, the relay node relays in block 204 all data of the first logical connection between the terminal device and the base station.

In block 206, the network element communicates with the terminal device over a second logical connection comprising an uplink physical connection and a downlink physical connection, wherein only the uplink physical convection is routed through the relay node. With respect to the operation from the viewpoint of the base station, the base station communicates in block 206 all downlink data of the second logical connection directly to the terminal device and receives all uplink data through the relay node. From the viewpoint of the relay node, the relay node receives uplink data and control information of the second logical connection from the terminal device and relays the received information to the base station. In some embodiments, the relay node assists the base station in the transmission of some downlink data, as will be described in greater detail below.

Figure 3:
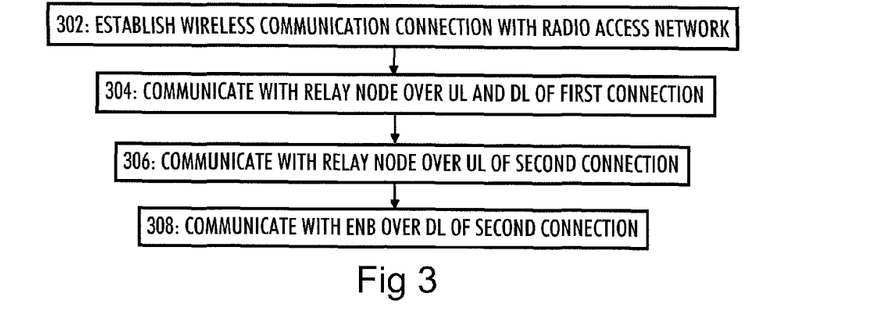

FIG. 3 illustrates a process for arranging connections in the terminal device. The process may be carried out in a communication circuitry of the terminal device. Referring to FIG. 3, a wireless communication connection with a radio access network of the cellular telecommunication system is established in block 302. Block 302 may include establishment of two logically separate connections with the radio access network, where the different logical connections relate to, for example, different communication applications operated in the terminal device. The radio access network comprises the base station and the relay node (and other base stations, relay nodes, and other network elements).

In block 304, the terminal device communicates with the relay node over an uplink physical connection and a downlink physical connection of the first logical convection routed through the relay node. In block 306, the terminal device communicates with the relay node over an uplink physical connection of a second logical connection. In block 308, the terminal device communicates with the base station directly over a downlink physical connection of the second logical connection.

With respect to the second logical connection, the relay node may assist both the terminal device and the base station in all the necessary uplink control functions related to the downlink bearer service of the second logical connection delivered directly from the base station to the terminal device. In this new arrangement, downlink physical layer channel quality indicator (CQI) reporting, physical (L1) and/or Link (L2) layer hybrid automatic repeat request (HARQ) acknowledgements, L2 radio link control (RLC) status reporting, and other control information may be routed through the relay node. The relay node may be configured to relay the control information to the base station according to a determined relay scheme. The base station and the relay node may also share connection contexts of the terminal device, including identifiers and classification (capabilities) of the terminal device or allocate a common new identifier to the terminal device so as to discriminate different terminal devices and their different logical connections.

Figure 4:
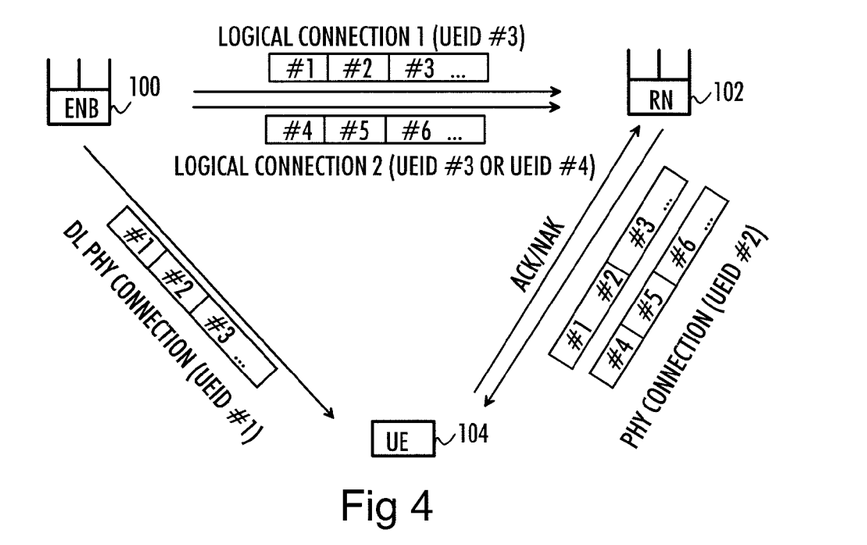
FIG. 4 illustrates cooperative downlink communication according to an embodiment of the invention.

With respect to the identifiers in different interfaces of the present communication arrangement, let us refer to FIG. 4. A first physical identifier is used to identify the terminal device in the downlink physical connection between the base station and the terminal device, and downlink communication of this (second) logical connection is carried out by using the first physical identifier. A second physical identifier is used to identify the terminal device in the physical connections of the first logical connection having both uplink and downlink routed through the relay node, and both uplink and downlink communication of this logical connection is carried out by using the second physical identifier. The second physical identifier may also be used when communicating on the uplink physical connection of the second logical connection with the relay node. In other words, in all physical layer communication between the relay node and the terminal device, the same physical layer terminal identifier may be used. With respect to the interface between the base station and the relay node, the terminal device may be identified by using one or more higher layer identifiers that are invisible to the terminal device, i.e. they are only used to identify the terminal device between the base station and the relay node. Different higher layer identifiers may be used for the two logical connections in this interface so as to discriminate the two connections. With respect to the two uplink physical connections with the relay node, the same physical layer terminal identifier may be used for both physical uplink connections, but the two uplink connections may be discriminated by specifying in physical layer communications an information element having a different value for the two different uplink connections. With respect to the CQI, transmission of a CQI report may be instructed to the terminal by the relay node (in coordination with the base station), therefore the relay node is able to carry out the configuration such that it may discriminate the CQIs of the different connections on the basis of the configuration, e.g. the CQI report is configured to be transmitted at different times to different connections or the CQI is configured to be measured from a specific physical resource block allocated to the two connections sufficiently separated in time to avoid the mixing of the CQI reports. With respect to the MAC layer HARQ, a HARQ process identifier may be used to distinguish if the ACK/NACK is for the first or the second connection. For the RLC layer ARQ, a logical connection identifier, e.g. a logical channel identifier in the UMTS LTE, may be used to discriminate the two connections. The connection arrangement described above may be achieved during establishment of the connections and/or as a result of a handover. The base station may be configured to broadcast a signal comprising a message indicating that the radio access network provides support for a logical connection having a physical uplink connection routed through a different node than a physical downlink connection of the same logical connection. When setting up the communication context of the terminal device, the radio access network (the base station) and the terminal device may exchange a message indicating that the terminal device provides support for such distributed physical connections of the same logical connection. Then, the radio access network may initially configure a logical connection to have such a distributed physical connection, or it may first configure the logical connection to first have both uplink and downlink physical connections to be routed through the same path in the interface between the radio access network and the terminal device and, thereafter, carry out a partial handover where one of the uplink and downlink physical connections is handed over to a target node while the other physical connection remains in communication with a source node. Based on the indication of the capability of the terminal device to support the distributed physical connections, the serving base station that also supports the distributed physical connections may configure the terminal device with related cellspecific configuration and control information. Such a configuration and information may include, for example, triggering conditions for radio link measurements and reporting them in the distributed mode. In connection with the partial handover or establishment of the distributed physical connections, the network element currently controlling the communication of the terminal device may provide the terminal device with information relevant to the network element to which either uplink or downlink will be handed over. Such information includes, for example, a cell identifier, a frame structure and its half-duplex allocation, reference signal information, downlink timing or synchronization information, and HARQ-related information. The partial handover may be initiated by a serving network element in a cell where the terminal device currently resides, i.e. by the relay node or the base station, on the basis of measurement reports received from the terminal device. The measurement reports may be taken into account together with other parameters (e.g. current load in the base station and in the relay node). However, the partial handover may also be triggered by the terminal device itself. The handover is triggered by a partial handover command in a radio link reconfiguration request message transmitted through a physical layer of the connection which is being handed over. The partial handover command may specify which one of the uplink and downlink physical connections is to be handed over to a target node. When the partial handover is initiated by the relay node, only some of the downlink physical connections of the terminal device is (are) handed over to the target base station and the rest are kept with the relay node. When the partial handover is initiated by the base station, only some of the downlink physical connections of the terminal device are kept at the base station, while the other physical connections are handed over to the target relay node. As the terminal device has two active logical downlink connections through different communication paths in the present connection arrangement, such an arrangement may be utilized for distributed transmission where some of the downlink data packets of one of the two logical connections are delivered to the terminal device directly from the base station, while the other data packets of the same logical connection are routed through the relay node. The data packets are referred to as transport blocks in the UMTS LTE. The logical connection having its data packets routed through the two different paths may be the logical connection having both uplink and downlink routed through the same path, or it may be the logical connection having uplink and downlink routed through different paths. FIG. 4 illustrates a distributed transmission of data packets. The numbering of the data packets refers to HARQ processes, i.e. each data packet belongs to a HARQ process, wherein the HARQ process ensures the delivery of the data packet to the destination by applying acknowledgment messages returned as feedback information from the receiver (terminal device) to the transmitter (base station or relay node). The data packets of the first logical connection may be transferred in a conventional manner to the terminal device through the relay node. With respect to the second logical connection having downlink transmitted directly from the base station to the terminal device and uplink routed through the relay node, the data packets are, in this embodiment, delivered to the terminal device in a distributed manner by establishing a second downlink physical connection of the second connection, wherein the second downlink physical connection is routed through the relay node and used particularly for possible retransmissions of data packets that are erroneously received over the second logical connection. For instance, certain HARQ processes assigned with specific HARQ identifiers are allocated exclusively to the base station for transmission to the terminal device, while the remaining HARQ processes are allocated to the relay node for transmission to the terminal device. The data packets received over the downlink physical connection from the relay node may be provided with an identifier enabling the terminal device to discriminate whether each data packet belongs to the first or the second logical connection, and to combine the data packets appropriately for higher layer processing.

With respect to the numbering of the HARQ processes of the second logical connection, the base station uses a given HARQ numbering and numbers (or identifiers) the data packets with a unique HARQ numbering. The data packets with such a HARQ numbering are then transmitted to the relay node for retransmission to the terminal device. The relay node receives the downlink data packets of the second logical connection from the base station, and it may use the same HARQ numbering when transmitting the data packets to the terminal device. In another embodiment, the relay node stores the original HARQ numbering of the data packets and changes the HARQ numbering of the data packets to accommodate the HARQ numbering the relay node uses, e.g. to prevent two data packets of different connections to have the same HARQ number. Accordingly, the relay node changes the HARQ numbering of the data packets of the second logical connection received from the base station. Then, the relay node transmits the data packets to the terminal device with the changed HARQ numbering. Upon reception of positive acknowledgment messages (ACK) for the data packets from the terminal device, wherein the acknowledgment messages refer to the changed HARQ numbering, the relay node restores the HARQ numbering of the acknowledgment messages to correspond to the original HARQ numbering used by the base station. Then, the relay node transmits the acknowledgment messages with the restored HARQ numbering to the base station. Upon reception of negative acknowledgments (NAK), the relay node retransmits the data packets according to the applied HARQ scheme. Such a HARQ renumbering prevents overlapping HARQ numbering in the interface between the relay node and the terminal device, while it maintains the original HARQ numbering in the interface between the base station and the relay node. In another embodiment, the base station distributes four (exemplary number) HARQ processes to the downlink of the logical connection routed through the relay node (numbered 1 to 4) and another four HARQ processes to the downlink of the logical connection routed directly from the base station to the terminal device (numbered from 5 to 8). However, if Un interface is used between the terminal device and the base station, HARQ processes thereof may use, instead of the numbering from 5 to 8, numbering 1 to 4. Then, the base station maps the Uu interface HARQ processes 5 to 8 and Un interface HARQ processes 1 to 4 for retransmissions and ACK/NAK of the data packets over this logical connection. Upon reception of ACKs, the base station may restore the original HARQ mapping.

When the terminal device receives data packets (transport block in the LTE(A)) from the base station, it transmits acknowledgment messages (ACK/NAK) for the data packets to the relay node in a given uplink sub-frame of the relay node. The HARQ process number of the data packet may be indicated to the relay node together with the ACK/NAK to identity the data packet. The relay node is then responsible for forwarding the received ACK/NAK information to the base station. The relay node may carry out retransmissions of erroneously received data packets for the HARQ processes assigned to it, while the base station carries out retransmissions of the other erroneously received data packets. In another embodiment, the retransmissions are also arranged in a distributed manner. The relay node may help the base station in HARQ retransmissions upon request from the base station or by default, e.g. it may be a semi-statically configured procedure. The base station may deliver the relevant data packets to be retransmitted to the relay node, when necessary, either upon reception of a NAK for the data packets from the terminal device or even before or at the initial transmission of the data packets to the terminal device. The data packets may be communicated to the relay node together with information on the HARQ process numbers and a redundancy version of the data packets to enable the relay node to carry out the retransmission according to an appropriate HARQ scheme. These additional HARQ information elements may be attached to the data packets as a control header and, then, the data packet may be multiplexed with other data packets (that are a part of the other logical connection) destined to the relay node. To facilitate the discrimination of the retransmission data packets from other data packets, the base station may apply to the retransmission data packets a different terminal identifier than in the other data packets. The terminal identifier may be a higher level identifier mentioned above or it may be a physical layer terminal identifier used in the interface between the base station and the terminal device. This enables the relay node to discriminate the HARQ retransmission data packets to be retransmitted to the terminal device on behalf of the base station and the data packets that relate to the other logical connection. In yet another embodiment related to using different terminal device identifiers between the base station and the relay node, a 1-bit flag may be included in the data packets, added to the control header of the data packets to indicate which data packet is intended for the HARQ retransmission on behalf of the base station and which data packet is intended for the other logical connection. Such a flag may be included in all data packets exchanged between the base station and the relay node.

The number of simultaneously operating HARQ processes may be limited to a given number for a given logical connection or for a given terminal device, e.g. eight. In the former case, the maximum number of HARQ processes may be divided between the base station and the relay node for each connection according to a determined criterion. For example, the maximum number of HARQ processes may be divided equally between the relay node and the base station, or they may be divided unequally. Unequal division may be based on channel conditions between the two physical channels (more HARQ processes are given to the node with better downlink channel conditions towards the terminal device) and/or traffic load in the nodes (more HARQ processes are given to the node with a lower traffic load). Other criteria are equally possible. In the latter case, the maximum number of simultaneously operating HARQ connections may further be divided between the connections of the terminal device.

As mentioned above, the interfaces between the base station and the relay node (Un interface) and between the base station or relay node and the terminal device (Uu interface) apply different communication formats at least with respect to control signaling. In an embodiment, the terminal device is configured to support communication formats according to the specifications of both the Uu interface and the Un interface. This provides several advantages in addition to those mentioned above. For example, the base station may then spatially multiplex its transmissions to the terminal device and to the relay node by using beamforming techniques to direct radiation patterns towards the relay node and the terminal device. It also allows the base station to spatially multiplex the transmission of a data packet of a given HARQ process to both the terminal device as an initial transmission and to the relay node for possible retransmission purposes. Further, it also allows the relay node to capture data packets the base station transmits to the terminal device for possible retransmission purposes. Accordingly, the base station does not have to separately transmit the same data packet to the terminal device and to the relay node for assisted retransmission, as described above.

Figure 5:
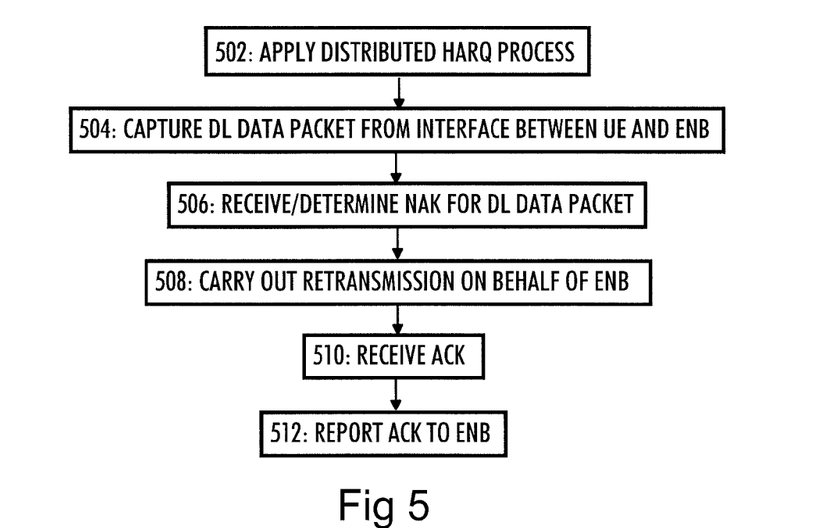
FIG. 5 is a flow diagram of a process for downlink retransmissions according to an embodiment of the invention.

FIG. 5 describes a procedure for such an assisted retransmission. In block 502, the distributed HARQ retransmission process is applied upon request from the base station as a dynamic or semi-static parameter. Accordingly, the relay node configures its receiver to receive downlink data packets the base station schedules to the terminal device in the Un interface, i.e. the relay node listens to a relay physical downlink control channel carrying scheduling messages from the base station and relay physical downlink shared channel (R-PDSCH) carrying the data packets according to the scheduling. In block 504, the relay node captures a downlink data packet destined to the terminal device from the R-PDSCH. In block 506, the relay node receives a NAK related to the data packet from the terminal device. As described above, the relay node relays all uplink connections of the terminal device to the base station and, thus, is able to receive the ACK/NAKs for the data packets transmitted directly from the base station to the terminal device. The NAK may also be determined from the absence of an acknowledgment message for the data packet within a preset duration. Upon determining that the terminal has not received the data packet correctly in block 506, the relay node carries out the retransmission of the data packet in block 508 by retransmitting the captured data packet. Upon reception of ACK for the data packet from the terminal device in block 510, the relay node reports the ACK to the base station in block 512.

With respect to the terminal device supporting both Un and Uu interface communications, the base station may configure the terminal device to switch between these two interface modes when communicating directly with the base station. Moreover, the base station may even configure the terminal device to apply an additional uplink Un or Uu interface control link in the direct communication with the base station in order to exchange layer 1 uplink control signaling directly. As a consequence, the connection arrangement may be similar to that described in FIG. 1B, but there is an additional direct uplink control connection between the base station 100 and the terminal device 104.

As the terminal device communicates with two different network elements in a scheduling based manner, it needs to stay synchronized to both network elements while switching communication between the two network elements. In order to improve the synchronization, any one of the two network elements (or both of them) may transmit a dedicated reference signal to the terminal device so as to improve synchronization accuracy. In another embodiment, the terminal device may be configured to synchronize to the different network elements in an alternating manner. In LTE(A), sub-frames carrying downlink synchronization channels are sub-frames #0 and #5. The terminal device may be configured to first synchronize to sub-frame #0 transmitted by the base station, subsequently synchronize to sub-frame #5 transmitted by the relay node, then again synchronize to sub-frame #0 transmitted by the base station, etc.

Figure 6:
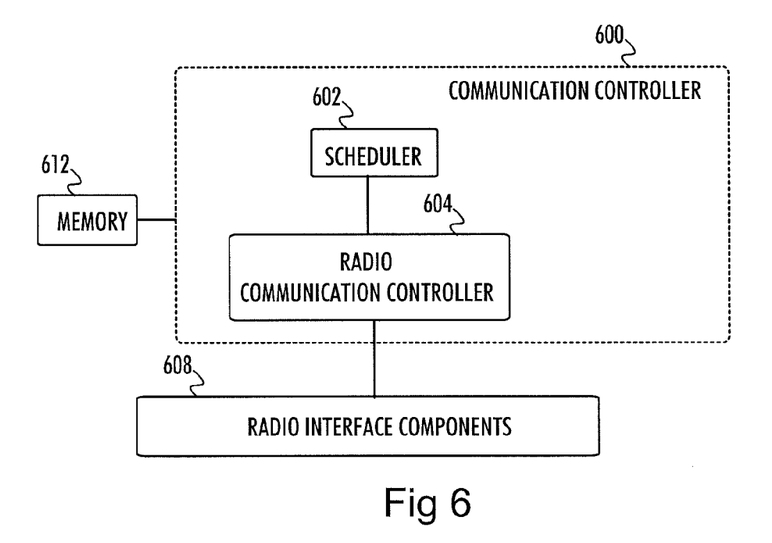
FIGS. 6 and 7 are block diagrams illustrating exemplary structures of apparatuses according to embodiments of the invention.

FIG. 6 illustrates an exemplary structure of an apparatus according to an embodiment of the invention. The apparatus may be applicable to the base station or the relay node described above and it may comprise at least one processor and at least one memory 612 including a computer program code, wherein the at least one memory and the computer program code are configured, with the at least one processor, to cause the apparatus to carry out the above-described functionalities of the base station or the relay node. The at least one processor may implement a communication controller 600 controlling the communication-related operation of the apparatus. When the apparatus is the base station or a fixed relay node, it may additionally comprise a power source connected to the mains and additional components and functionalities related to providing access to other parts of the radio access network and to other networks, e.g. the Internet, and to controlling the operation of numerous terminal devices within its cell. When the apparatus is a mobile relay node, it may have a structure similar to that illustrated in FIG. 7 with additional components providing the capability of operating as the mobile relay node.

Referring to FIG. 6, the apparatus comprises radio interface components 608 providing the apparatus with a capability of providing radio communication capability with the terminal devices and other elements communicating wirelessly in the radio access network. The radio interface components 608 may comprise transceiver circuitries to carry out signal processing related to transmission and reception of signals in the radio access network. The radio interface components 608 carry out filtering, amplification, frequency-conversion, and transmission/reception digital signal processing operations, e.g. channel estimation, equalization, demodulation, detection, and decoding.

The memory 612 may store the computer programs configuring the operation of the apparatus in connection with at least one processor executing the computer programs. Additionally, the memory may store communication parameters needed in the radio communication in the radio access network, e.g. channel allocation, radio channel parameters, a list of served terminal devices, and a database of identifiers.

The communication controller circuitry 600 controls the operation of the apparatus at least with respect to the radio communication of the apparatus. The communication controller circuitry 600 may comprise a radio communication controller sub-circuitry 604 handling the radio communication by exchanging control information with the other elements of the radio access network (base station, relay node, terminal devices) and by communicating data traffic. The radio communication controller 604 may be configured to support distributed uplink and downlink connections for a given logical connection of a given terminal, as described above. Additionally, the radio communication controller may support other, non-distributed uplink and downlink connections for another logical connection of the same terminal device. The two connections may be used in the above-described manner to carry out cooperative downlink communications between the two logical connections. For example, the downlink connection of the non-distributed logical connection may transfer a portion of the downlink traffic of the distributed logical connection, as described above. The radio communication controller may contain a packet handler that carries out multiplexing and demultiplexing of data packets so as to separate data packets of the two (or more) different connections.

The communication controller circuitry 600 may further comprise a schedules circuitry 602 scheduling transmissions within the coverage area of the apparatus. When the apparatus is implemented in the base station, the scheduler 602 may schedule transmissions of the terminal devices and wireless relay nodes in its cell. When the apparatus is implemented in the relay node, the scheduler receives scheduling information from the base station for which it carries out relaying. The scheduling information contains scheduling for both the link between the relay node and the base station and the link between the relay node and the terminal device. With respect to the link between the relay node and the terminal device, the scheduler further schedules the available resources for uplink and downlink communications with the terminal device. The scheduler may handle the physical uplink connections of the two logical connections as separate physical connections, or it may multiplex the uplinks of the two logical connections into a single physical uplink connection, wherein data packets of different connections are provided with a unique identifier to enable the appropriate demultiplexing of data packets.

Figure 7:
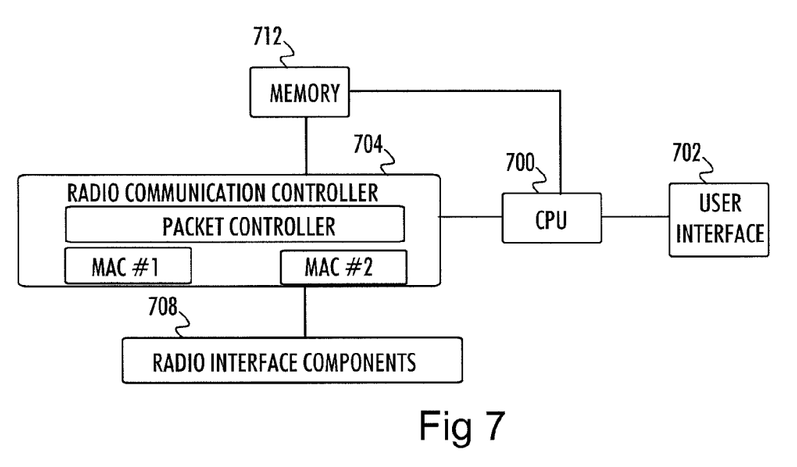

FIG. 7 illustrates an exemplary structure of another apparatus according to an embodiment of the invention. The apparatus of FIG. 7 may be applicable to the terminal device described above and it may comprise at least one processor and at least one memory 712 including a computer program code, wherein the at least one memory 712 and the computer program code are configured, with the at least one processor, to cause the apparatus to carry out the above-described functionalities of the terminal device. The at least one processor may implement a radio communication controller circuitry 704 controlling the radio communication-related operation of the client station. The at least one processor may additionally comprise a central processing unit (CPU) 700 controlling the overall operation of the terminal device according to instructions received from an operating system, computer programs (applications) launched in the terminal device, peripheral device drivers, etc. The terminal device may be a computer, a portable communication device, a mobile phone, a work station, etc. In an embodiment, the apparatus of FIG. 7 is the terminal device comprising the components of FIG. 7 and additional components and functionalities. The apparatus of FIG. 7 comprises radio interface components 708 providing the apparatus with a capability of operating multiple radio connections. The radio interface components 708 may comprise transceiver circuitries to carry out signal processing related to transmission and reception of signals with base stations and relay nodes of the radio access network. The radio interface components 708 carry out filtering, amplification, frequency-conversion, and transmission/reception digital signal processing operations, e.g. channel estimation, equalization, demodulation, detection, and decoding.

The memory 712 may store the computer programs configuring the operation of the apparatus in connection with at least one processor executing the computer programs. Additionally, the memory may store communication parameters needed in the radio communication in the radio access network, e.g. channel allocation, radio channel parameters, a list of neighboring base stations, one or more physical layer identifier assigned to the terminal device (e.g. cellular radio network temporary identifiers, C-RNTI).

The apparatus further comprises a user interface 702 comprising input and output means for interacting with a user of the apparatus. The user interface 702 may comprise a display, a keypad/keyboard or other input means, a microphone, a loudspeaker, a touch-sensitive display, etc. The radio communication controller circuitry 704 is configured to control radio communications with the relay nodes and the base stations, as described above. In response to the reception of an instruction from the CPU 700 to establish wireless connections, the radio communication controller circuitry 704 configures the radio interface components 708 to establish a communication connection with a base station and/or a relay node, depending on a cell where the terminal device currently resides. In connection with the establishment of the connection, the radio communication controller 704 may exchange signaling information indicating that the base station, the relay node and the terminal device all support distributed connections where uplink and downlink of one of the terminal device's connections are routed through different paths and where uplink and downlink of another connection are routed through the same path. In connection with the establishment of the connections or during the operation of the connections as a result of a partial handover, the connection arrangement described in FIG. 1B is realized. The data transfer in such a connection arrangement may be carried out, as described above in connection with any one of FIGS. 2 to 5. The radio communication controller 704 may comprise separate Medium Access Controller (MAC) entities for two physical layer connections with the base station and the relay node. A first MAC entity may handle the downlink physical connection with the base station, while a second MAC entity may handle the uplink and downlink physical layer connections with the relay node. The radio communication controller may further comprise a packet controller handling data packet multiplexing/demultiplexing in a case where data packets of multiple downlink/uplink logical connections are transferred through a single physical layer connection.

As used in this application, the term 'circuitry' refers to all of the following: (a) hardware-only circuit implementations, such as implementations only in analog and/or digital circuitry, and (b) to combinations of circuits and software (and/or firmware), such as (as applicable): (i) a combination of processor(s) or (ii) portions of processor(s)/software including digital signal processor(s), software, and memory or memories that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in a server, a cellular network device, or other network device.

The processes or methods described in FIGS. 2, 3, and 5 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of mobile telecommunication systems, their network elements and subscriber terminals, develop rapidly. Such a development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:
1. A method, comprising:
establishing, in a network element of a radio access network, a wireless communication connection with a terminal device;
communicating with the terminal device over a first logical connection comprising an uplink physical connection and a downlink physical connection both routed through a relay node;
communicating with the terminal device over a second logical connection comprising an uplink physical connection and a downlink physical connection, wherein only the uplink physical connection is routed through the relay node;
distributing downlink automatic repeat request processes in relation to the second logical connection amongst the base station and the relay node;
capturing in the relay node a data packet of a downlink hybrid automatic repeat request process of the second logical connection from a message transmitted from the base station directly to the terminal device;
determining in the relay node that the data packet of the downlink hybrid automatic repeat request was not received in the terminal device; and
carrying out in the relay node retransmission of the captured data packet to the terminal device.

2. The method of claim 1, further comprising determining whether or not the data packet is received correctly in the terminal device on the basis of an acknowledgment message received through the uplink physical connection of the second logical connection.

3. A method, comprising:
 establishing, in a network element of a radio access network, a wireless communication connection with a terminal device;
 communicating with the terminal device over a first logical connection comprising an uplink physical connection and a downlink physical connection both routed through a relay node;
 communicating with the terminal device over a second logical connection comprising an uplink physical connection and a downlink physical connection, wherein only the uplink physical connection is routed through the relay node;
 distributing downlink automatic repeat request processes in relation to the second logical connection amongst the base station and the relay node;
 receiving, in the relay node, downlink data packets of the second logical connection to be transmitted to the terminal device on behalf of the base station, wherein each data packet is associated with a different automatic repeat request process and numbered with an automatic repeat request process numbering used by the base station;
 changing the automatic repeat request numbering of the data packets;
 causing transmission of the data packets to the terminal device with the changed automatic repeat request numbering;
 receiving from the terminal device acknowledgment messages for the data packets, wherein the acknowledgment messages refer to the changed automatic repeat request numbering;
 restoring the automatic repeat request numbering of the acknowledgment messages to correspond to the original automatic repeat request numbering used by the base station; and
 causing transmission of the acknowledgment messages with the restored automatic repeat request numbering.

4. The method of claim 1, further comprising: providing downlink data packets communicated from the base station to the relay node with a flag indicating whether the data packet belongs to the first logical connection or the second logical connection.

5. The method of claim 1, further comprising: setting up the second logical connection to have the uplink physical connection routed through the relay node and the downlink physical connection communicated directly between the base station and the terminal device as a result of a partial handover of the terminal device, wherein some of the physical connections remain in a source node of the handover while other physical connections are handed over to a target node of the handover.

6. A method, comprising:
 establishing, in a terminal device of a wireless telecommunication system, a wireless communication connection with a radio access network of the wireless telecommunication system comprising a base station and a relay node;
 communicating with the relay node over an uplink physical connection and a downlink physical connection of a first logical connection routed through the relay node;
 communicating with the relay node over an uplink physical connection of a second logical connection; and
 communicating with the base station directly over a downlink physical connection of the second logical connection;
 receiving from the radio access network a signal comprising a message indicating that the radio access network provides support for a logical connection having a physical uplink connection routed through a different node than a physical downlink connection of the same logical connection;
 causing transmission of a signal comprising a message indicating that the terminal device provides support for the distributed physical connections of the same logical connection; and
 receiving from the radio access network a partial handover command handing over the physical uplink connection and the physical downlink connection of the second logical connection to different nodes of the radio access network.

7. The method of claim 6, wherein an interface between the base station and the relay station applies a first communication format and an interface between any one of the base station and the relay node applies a second communication format different from the first communication format, the method further comprising: configuring the terminal device to communicate according to both first communication format and the second communication format.

8. The method of claim 6, further comprising: using different identifiers for the uplink physical connection and the downlink physical connection of the second logical connection.

9. An apparatus comprising: at least one processor; and at least one memory including a computer program code, wherein the at least one memory and the computer program code are configured, with the at least one processor, to cause the apparatus to:
 cause establishment of a wireless communication connection with a terminal device;
 communicate with the terminal device over a first logical connection comprising an uplink physical connection and a downlink physical connection both routed through a relay node;
 communicate with the terminal device over a second logical connection comprising an uplink physical connection and a downlink physical connection, wherein only the uplink physical connection is routed through the relay node;
 distribute downlink automatic repeat request processes in relation to the second logical connection amongst the base station and the relay node, wherein downlink automatic repeat request processes of the second logical connection are distributed amongst the base station and the relay node, wherein the apparatus is applicable to the relay node;
 capture a data packet of a downlink hybrid automatic repeat request process of the second logical connection from a message transmitted from the base station directly to the terminal device;
 determine that the data packet of the downlink hybrid automatic repeat request was not received in the terminal device; and
 cause retransmission of the captured data packet to the terminal device.

10. The apparatus of claim 9, wherein the at least one memory and the computer program code are configured, with the at least one processor, to cause the apparatus to determine whether or not the data packet is received correctly in the terminal device on the basis of an acknowledgment message received through the uplink physical connection of the second logical connection.

11. An apparatus comprising: at least one processor; and at least one memory including a computer program code, wherein the at least one memory and the computer program code are configured, with the at least one processor, to cause the apparatus to:
cause establishment of a wireless communication connection with a terminal device;
communicate with the terminal device over a first logical connection comprising an uplink physical connection and a downlink physical connection both routed through a relay node;
communicate with the terminal device over a second logical connection comprising an uplink physical connection and a downlink physical connection, wherein only the uplink physical connection is routed through the relay node;
distribute downlink automatic repeat request processes in relation to the second logical connection amongst the base station and the relay node;
receive downlink data packets of the second logical connection to be transmitted to the terminal device on behalf of the base station, wherein each data packet is associated with a different automatic repeat request process and numbered with an automatic repeat request process numbering used by the base station;
change the automatic repeat request numbering of the data packets;
cause transmission of the data packets to the terminal device with the changed automatic repeat request numbering;
receive from the terminal device acknowledgment messages for the data packets, wherein the acknowledgment messages refer to the changed automatic repeat request numbering;
restore the automatic repeat request numbering of the acknowledgment messages to correspond to the original automatic repeat request numbering used by the base station; and
cause transmission of the acknowledgment messages with the restored automatic repeat request numbering.

12. The apparatus of claim 9, wherein the at least one memory and the computer program code are configured, with the at least one processor, to cause the apparatus to:
detect a flag in downlink data packets received from the base station, the flag indicating whether the data packet belongs to the first logical connection or the second logical connection.

13. The apparatus of claim 9, wherein the at least one memory and the computer program code are configured, with the at least one processor, to cause the apparatus to:
set up the second logical connection to have the uplink physical connection routed through the relay node and the downlink physical connection communicated directly between the base station and the terminal device as a result of a partial handover of the terminal device, wherein some of the physical connections remain in a source node of the handover while other physical connections are handed over to a target node of the handover.

14. The apparatus of claim 9, wherein the apparatus is a base station of the radio access network of the wireless telecommunication system.

15. An apparatus, comprising:
at least one processor; and
at least one memory including a computer program code, wherein the at least one memory and the computer program code are configured, with the at least one processor, to cause the apparatus to:
cause establishment of a wireless communication connection with a radio access network of the wireless telecommunication system comprising a base station and a relay node;
communicate with the relay node over an uplink physical connection and a downlink physical connection of a first logical connection routed through the relay node;
communicate with the relay node over an uplink physical connection of a second logical connection;
communicate with the base station directly over a downlink physical connection of the second logical connection;
receive from the radio access network a signal comprising a message indicating that the radio access network provides support for a logical connection having a physical uplink connection routed through a different node than a physical downlink connection of the same logical connection;
cause transmission of a signal comprising a message indicating that the terminal device provides support for the distributed physical connections of the same logical connection; and
receive from the radio access network a partial handover command handing the physical uplink connection and the physical downlink connection of the second logical connection to different nodes of the radio access network.

16. The apparatus of claim 15, wherein an interface between the base station and the relay station applies a first communication format and an interface between any one of the base station and the relay node applies a second communication format different from the first communication format, and wherein the at least one memory and the computer program code are configured, with the at least one processor, to cause the apparatus to con-figure the terminal device to communicate according to both first communication format and the second communication format.

17. The apparatus of claim 15, wherein the at least one memory and the computer program code are configured, with the at least one processor, to cause the apparatus to use different identifiers for the uplink physical connection and the downlink physical connection of the second logical connection.

18. A computer program product embodied on a non-transitory medium readable by a computer and comprising program instructions which, when loaded into an apparatus, execute the method according to claim 1.

19. A computer program product embodied on a non-transitory medium readable by a computer and comprising program instructions which, when loaded into an apparatus, execute the method according to claim 3.

20. The method of claim 3, further comprising: providing downlink data packets communicated from the base station to the relay node with a flag indicating whether the data packet belongs to the first logical connection or the second logical connection.

21. The method of claim 3, further comprising: setting up the second logical connection to have the uplink physical connection routed through the relay node and the downlink physical connection communicated directly between the base station and the terminal device as a result of a partial handover of the terminal device, wherein some of the physical connections remain in a source node of the handover while other physical connections are handed over to a target node of the handover.

22. The apparatus of claim 9, wherein the at least one memory and the computer program code are configured, with the at least one processor, to cause the apparatus to:
   detect a flag in downlink data packets received from the base station, the flag indicating whether the data packet belongs to the first logical connection or the second logical connection.

23. The apparatus of claim 9, wherein the at least one memory and the computer program code are configured, with the at least one processor, to cause the apparatus to:
   set up the second logical connection to have the uplink physical connection routed through the relay node and the downlink physical connection communicated directly between the base station and the terminal device as a result of a partial handover of the terminal device, wherein some of the physical connections remain in a source node of the handover while other physical connections are handed over to a target node of the handover.

24. The apparatus of claim 9, wherein the apparatus is a base station of the radio access network of the wireless telecommunication system.

* * * * *